Figure 1:
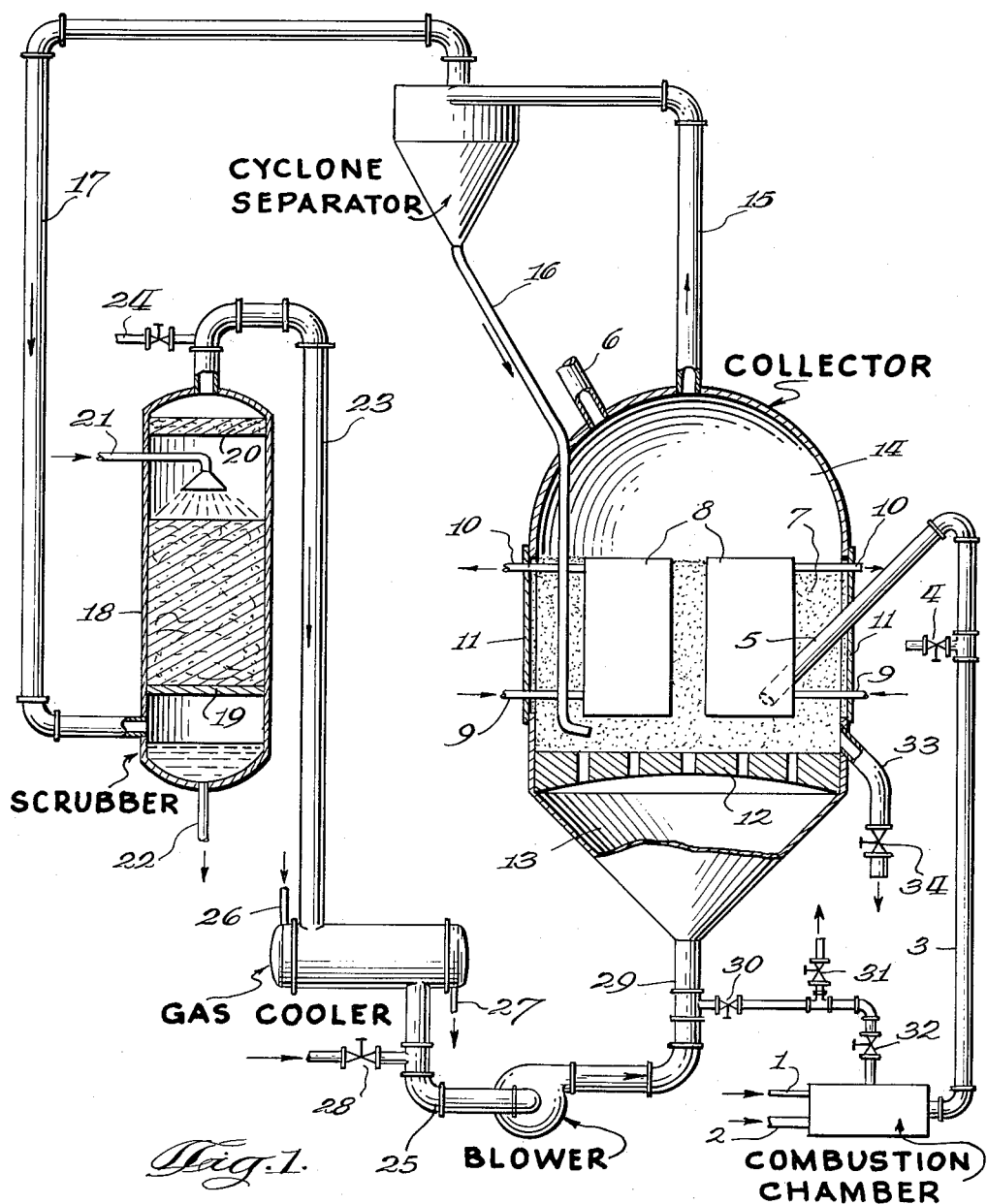

June 9, 1964  G. I. KLEIN ETAL  3,136,603
COATED $P_2O_5$ AND ITS METHOD OF MANUFACTURE
Filed Dec. 5, 1960  3 Sheets—Sheet 3
*Fig. 3.*
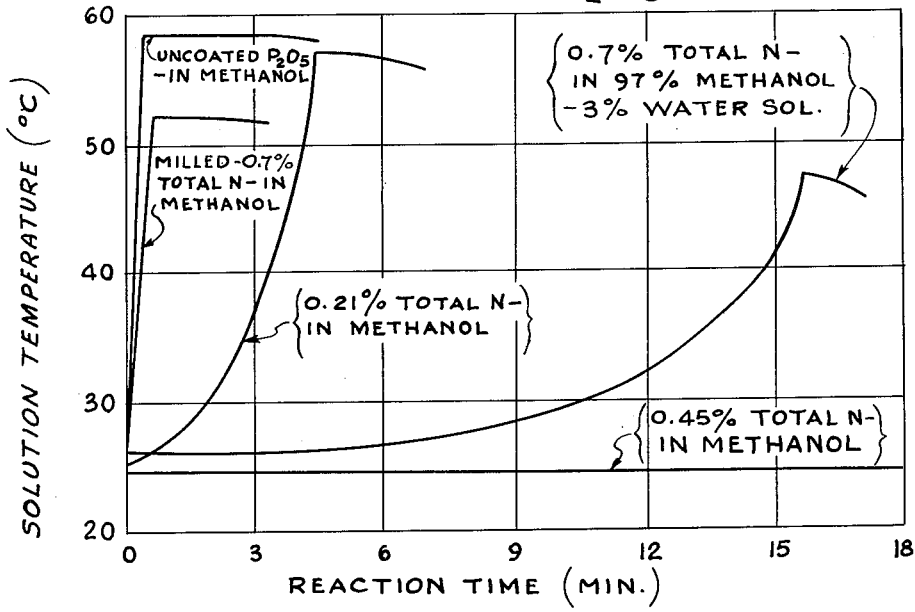
COMPARISON OF REACTIVITY BETWEEN COATED AND UNCOATED $P_2O_5$
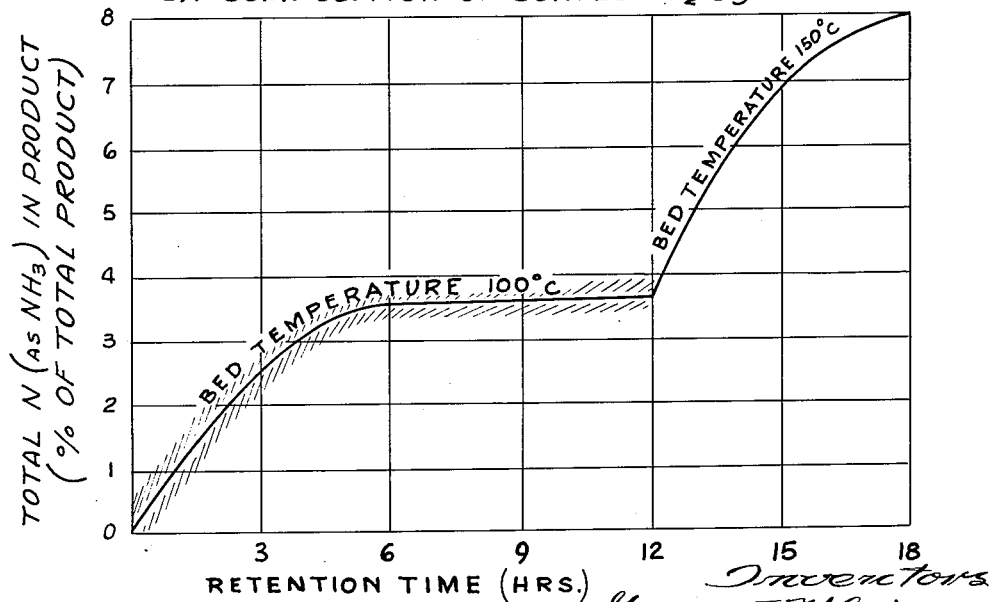
EFFECTS OF BED TEMPERATURE AND RETENTION TIME ON COMPOSITION OF COATED $P_2O_5$
*Fig. 4.*
Inventors
George I. Klein
Ralph E. Newby
Leo B. Post
By Lloyd L. Malone  Attorney 3,136,603
COATED P₂O₅ AND ITS METHOD OF
MANUFACTURE
George I. Klein, Park Forest, Leo B. Post, Chicago, and Ralph E. Newby, Steger, Ill., assignors to Stauffer Chemical Company, New York, N.Y., a corporation of Delaware
Filed Dec. 5, 1960, Ser. No. 73,803
5 Claims. (Cl. 23—165)

The present invnetion relates to coated phosphoric acid anhydride having as the coating substance a complex ammonia-phosphoric acid anhydride reaction product, and the novel method of producing the same.

The application is a continuation-in-part of the copending application, Serial No. 36,846, filed June 17, 1960, now U.S. Patent No. 3,100,693.

Phosphoric acid anhydride (alternatively denoted hereafter as $P_2O_5$) is a well-known article of commerce useful, mainly, as a fertilizer ingredient, catalyst, chemical intermediate, and conditioner. The great rapidity with which it reacts with atmospheric moisture and aqueous and non-aqueous substances, although in many applications a distinct advantage, can be a severe drawback where appreciable handling of the material is necessary, e.g., some fertilizer applications. The common commercial type of phosphoric acid anhydride will react violently even when added to fairly cool water and will begin to deliquesce within seconds after exposure to the atmosphere. Even the removal of this $P_2O_5$ from a sealed drum (a suitable commercial container for such material) can be problematical, since water is rather quickly absorbed when the seal is broken to form a tacky crust which will adhere to an unloading tool or prevent the free flow of the contents from the drum. Obviously, such $P_2O_5$ cannot be easily handled by shovel or a spreading device in the manner normally used to apply a fertilizer to the soil. Nor can $P_2O_5$ for any application, be it soil conditioning, catalysis etc., be handled, stored or shipped without painstaking precautions to exclude atmospheric moisture. Problems relating to the chemical transformations of $P_2O_5$ are similarly vexing. For example, the formation of phosphorus acids from solid $P_2O_5$ and water is attended by hissing, spitting, fuming, and a rapid temperature rise as the two come into contact. Summarily, the characteristic high reactivity of $P_2O_5$ makes it very difficult to handle and utilize for various applications.

An object of this invention is to provide a particulate material comprising mainly $P_2O_5$ and having slower reactivity than heretofore characteristic of $P_2O_5$.

Another object of this invention is to provide a particulate material comprising mainly $P_2O_5$ which can be handled and utilized in various applications where it is exposed to the influence of water, either vaporous or liquid, without suffering the disadvantages or requiring the precautions heretofore attending such applications.

Another object of this invention is to provide a fertilizer and soil conditioning composition containing a high percentage of $P_2O_5$ values and which is in a solid, easy to distribute form suitable for direct application to, or mixture with the soil.

A further object is to provide a method for manufacturing the products of this invention.

Other objects will appear to those skilled in the art as the description proceeds.

We have now found that gaseous ammonia can be controllably reacted with particles of $P_2O_5$ to give individual, uniform, continuous coatings about such particles of a slowly water soluble complex ammonia-$P_2O_5$ reaction product. So coated, the $P_2O_5$ has greatly retarded reactivity when brought into contact with water or other substances which would normally cause a vigorous reaction.

At first blush the coating phenomenon of this invention appears to be anomalous with respect to the known prior art reactions between solid $P_2O_5$ and ammonia gas. By way of illustration, the prior art shows products differing palpably from those of the present invention, although the exact same reactants are used. It shows processes where $P_2O_5$ and gaseous ammonia are reacted while vigorously agitating the reaction mixture, with the result that the $P_2O_5$ reacts completely with the ammonia to form a homogeneous product. Non-homogeneous reaction products have also been formed through variation in the processing conditions. For example, it has been found that if gaseous ammonia is passed through or over an unagitated, static bed of $P_2O_5$ particles, the bed appears to fuse or crust over with an impervious layer of reaction product, thus inhibiting further reaction between the $P_2O_5$ and ammonia. By this latter method it might be loosely said that the surface of the bed is "coated" with an ammonia-$P_2O_5$ reaction product. Microscopic examination of this non-homogeneous product, however, shows that the particles are not individually coated, but rather, sporadically reacted to give a non-uniform product.

We have found that by our method gaseous ammonia can be reacted with $P_2O_5$ particles to individually coat such particles with a uniform, continuous layer of reaction product, and that the thickness or quantity of this coating can be controlled to impart the desired reactivity to the resulting product. This unexpected difference between the compounds of the prior art and those of the present invention is attributed mainly to the processing peculiarities of the present method. A principal reason for the difference in the products lies in the amount and type of motion imparted to the reacting $P_2O_5$ particles. The prior art materials were formed under conditions of vigorous agitation or with no agitation at all, while we have found that a mild form of agitation, with a minimum of particle attrition, yields the novel coated composition of this invention. Such mild agitation as we contemplate is sufficient to promote coating uniformity by supplying enough particle motion to continuously expose new surfaces of the particles to the action of the ammonia gas, while being mild enough to avoid chipping or breaking off of any coating antecedently formed. An especially satisfactory type of mild agitation is supplied in a dense fluidized bed wherein the $P_2O_5$ is suspended as a dense phase through which the gaseous ammonia is passed. Another significant factor is the medium in which we carry out the reaction. By the prior art, $P_2O_5$ was often dispersed in an inert liquid such as mineral oil during reaction. The effect of the inert liquid, especially when vigorously agitated, was apparently to remove any reaction product from the $P_2O_5$ particles, thereby exposing more $P_2O_5$ to the action of the ammonia gas. The present method utilizes only a gaseous atmosphere comprising ammonia or ammonia and some inert, preferably anhydrous, gas in contact with the mildly agitated particles.

As mentioned above, a preferred method of the invention involves treating $P_2O_5$ particles maintained in a dense fluidized phase by means of an uprising stream of gases. To such gases is added a controlled amount of gaseous ammonia. The exhaust gases containing any unreacted ammonia can be reactivated with additional gaseous ammonia and recycled through the bed. Coated particles are discharged from the bed either continuously or batchwise. Since the reaction is exothermic, the heat is continuously removed to maintain the fluidized particles at a temperature below the melting point of the phosphoric acid anhydride constituent.

FIGURE 1 shows the best embodiment presently known to us of an apparatus suitable for practicing the method of the invention. However, it is to be understood that it is illustrative only, and not limiting, for obvious changes in arrangement, construction, and detail can be made without departing from our method.

Turning now to FIGURE 1, the apparatus contains a large vertical vessel or chamber for housing a bed of fluidized particles. Hereafter, this unit will be referred to as the "collector." The remaining large units comprise a combustion chamber, cyclone separator, scrubber, gas cooler, and blower. This aparatus is discussed in greater detail in our copending U.S. patent application, Serial No. 36,846, filed June 17, 1960, now U.S. Patent No. 3,100,693.

The method of the present invention will now be illustrated with reference to the apparatus, but with particular emphasis on the operating procedure used therewith to manufacture the products of the present invention. Any reference to the methods or products of our copending U.S. patent applications is given only to facilitate the better understanding of our present method.

In a batch method, a preferred $P_2O_5$ feed for this invention can first be prepared by oxidation of a stream of elemental phosphorus entering the combustion chamber through line 1 with a stream of air entering through line 2, and passing the resulting gaseous $P_2O_5$ through line 3 and extension 5 into the bed 7 where it condenses to an agglomerated form. The method for producing the preferred unique spherical, agglomerated $P_2O_5$ feed in similar apparatus is disclosed more fully in our U.S. Patent 3,077,382, issued February 12, 1963. To coat these particles the combustion chamber is turned off (while fluidization is continued) and a small amount of gaseous ammonia is injected into the system, either at the bed 7 by opening the valve on line 4 or at the recirculating system by opening the valve on line 24. Regardless of how the $P_2O_5$ solids are prepared, they can be fluidized in the collector and thereafter treated with gaseous ammonia to produce a coated product. Batch operation, therefore, has the advantage of requiring only a single apparatus to both prepare the feed and coat it with the ammonia-$P_2O_5$ reaction product.

In a continuous method, solid uncoated $P_2O_5$ particles, manufactured by any of the known methods or by the method mentioned above, are fed continuously through line 6 to a pre-established bed 7 of coated $P_2O_5$. The bed 7 is maintained in the expanded state by a recirculating fluidization gas containing ammonia. Again, a make-up stream of ammonia is injected into the recirculating gases either through line 4 or line 24.

During the reaction the bed is cooled by vertical cooling plates 8, of the type containing interior passages or voids for the circulation of a fluid. These are located above the horizontal gas distributing grid 12. A cooling fluid, usually water or other liquid, enters the plates through conduits 9 and after absorbing heat leaves through conduits 10. These conditions can be secured to mounting flanges 11 which are bolted to the collector wall.

The fluidizing gas supplied to the windbox 13 ascends through the constrictions in the horizontal gas distributing grid 12 and rises through the bed 7. The gases leaving the bed 7 pass upward through the supercontiguous freeboard space 14, leaving the collector through conduit 15. Large particles suspended in these gases are separated in a cyclone and returned to the bed 7 through a dip leg 16. Fluo-static pressure forces finely divided product solids from the bed through conduit 33 when the rotary paddle or star type valve 34 is opened. Particles of coated $P_2O_5$ are continuously withdrawn from the collector at a rate substantially equal to the feed rate, and sufficient to maintain the bed at about a constant volume. Static superatmospheric pressure is preferably used throughout the entire apparatus to eliminate leakage of air into the processing system through improper fittings or any of the conduits connected with the outside atmosphere. Thus moisture is prevented from entering and degrading the hygroscopic feed.

Very fine particles, too small for separation by a cyclone, are removed in the scrubber, which is a wet separator employing a liquor which will not cause appreciable humidification. The scrubber consists of a packed stationary bed 18 wherein the gases are contacted with a liquor. The scrubber liquor need not be completely non-aqueous but should be of a suitable composition that any contained water exerts only a small vapor pressure, e.g., superphosphoric or polyphosphoric acid having a $P_2O_5$ content of about 77%.

The off-gases leaving the cyclone through conduit 17 enter the scrubber near the bottom thereof, ascending through the packed bed 18 of Raschig rings retained on a conventional support 19. At the top of the scrubber, immediately below the gas exit, a mist screen 20 is positioned adjacent to the walls filling the horizontal cross-section of the unit. Scrubber liquor enters the unit through conduit 21 located between the packing 18 and the mist screen 20. From the bottom of the packing the liquor drips into the bottom of the scrubber vessel from where it is removed through conduit 22.

A cooler for the recirculating gases is not essential or always desirable, but it can offer flexibility of operation, and greater capacity, and is, therefore, shown with the apparatus. In the drawing the recirculating stream of fluidization gases is shown passing into the gas cooler through conduit 23 and leaving through conduit 25 while the cooling fluid enters and leaves the unit through conduits 26 and 27, respectively. A line 28 containing a normally closed valve and connected to conduit 25 functions as a gas inlet for starting up the blower. Compressed gases from the blower are delivered through conduit 29 to the lower compartment 13. Conduit means for bleeding off excess gases from the recirculating stream are shown connecting conduit 29 with the atmosphere and the combustion chamber. The valves 30 and 31 are normally open while valve 32 is normally closed, thereby forming a passage for gases to the outside atmosphere. However, under alternate operating procedure, gases can be recycled through the combustion chamber. This is accomplished with valve 30 and 32 open and valve 31 either throttled or closed.

The ammonia-$P_2O_5$ reaction product coating is of a rather uncertain chemical composition. However, it is known that such reaction products contain both ammoniacal nitrogen and nuclear or amide nitrogen components. The term "nuclear nitrogen" as used herein means nitrogen incapable of being liberated with caustic solution in the manner of true ammonium nitrogen. Further, it is believed that at least part of the reaction product of this invention is a polymerized form. Theoretically, a large number of possible chemical structural formulas can be drawn for the same reacting proportions of anhydrous $NH_3$ and $P_2O_5$; it is highly probable that the reaction product is a mixture of several different compounds having different degrees of polymerization. Compounds of related or similar chemical composition to the coatings of the present invention are shown in various U.S. Patents, e.g., see the following U.S. Patents: 2,122,122; 2,163,085; 2,713,536; and 2,717,198.

A typical analysis, based on the coated $P_2O_5$ product, of the composition of the coatings of the present invention formed at different temperatures is shown in the following table:

*Table I*

| | Reaction temperature, °C. | Total N (as $NH_3$), percent | Nuclear N (as $NH_3$), percent | Nuclear N as percent of Total N |
|---|---|---|---|---|
| Sample 1 | 100 | 4.1 | 1.3 | 32 |
| Sample 2 | 150 | 8.4 | 2.1 | 25 |

Both thin and thick coatings can be produced at the surface of $P_2O_5$ particles. By the method of the invention, prior art hexagonal crystals and the spherical, agglomerated particles shown in our copending U.S. Patent application, Serial No. 21,499, can be coated. However, it is preferable to use the spherical, agglomerated particles in the practice of this invention because of the ease with which they are fluidized and the superior coatings which can be produced thereon.

Figure 2:
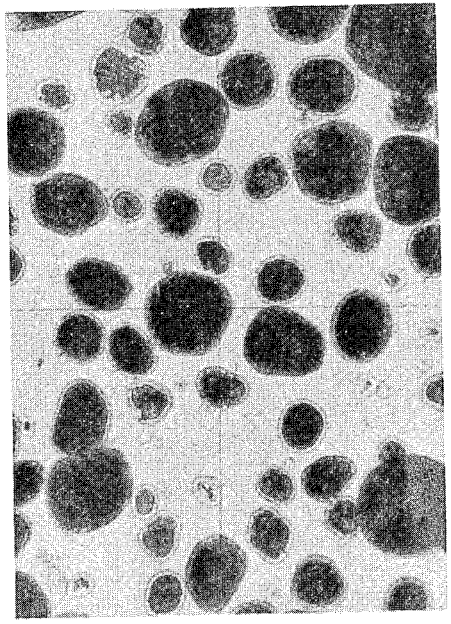

FIGURE 2 is a photomicrograph showing a preferred product of this invention magnified about 210 times. It will be observed that the substantially opaque, spherical agglomerated particles which form the nuclei are completely encapsulated by somewhat translucent, relatively thin coatings which follow the contours of the particles. Because of the narrow depth of field the coatings can best be observed on the particles in the median size range. With the aid of a microscope scale, and at a magnification of 450 times, the dimensions of some of the particles shown in this photomicrograph were measured. Analysis of the lot from which the sample pictured in FIGURE 2 was obtained showed a total nitrogen content of 8.0%. The dimensions are given in the following table:

*Table II*

DIMENSIONS OF COATED PARTICLES OF $P_2O_5$

| Diameter of $P_2O_5$ nuclei, microns | Overall diameter of particle, microns | Thickness of coating, microns |
|---|---|---|
| 55 | 68 | 6.5 |
| 64 | 77 | 6.5 |
| 68 | 84 | 8.0 |
| 84 | 103 | 9.5 |
| 84 | 100 | 8.0 |
| 87 | 103 | 8.0 |
| 94 | 113 | 9.5 |
| 100 | 117 | 8.5 |

Generally, the data show that the thickness of the coatings is independent of the size of the nucleus, not varying by more than a few microns between the largest and smallest particles. The same uniformity of thickness has been observed with much thinner and thicker coatings. However, because of the small size of the particles and the wide range of coating thicknesses, it is difficult to characterize the coatings in terms of their physical dimensions. A much more reliable and reproducible measurement can be obtained if the coatings are characterized by the percent of total nitrogen (as $NH_3$) in the encapsulated $P_2O_5$ product. By this type of measurement, the products of this invention will contain less than about 22.4% total nitrogen and as little as about 0.01% while a preferred product contains from 0.1% to 10.0% total nitrogen. Herein, where the percent total nitrogen is mentioned it is meant that such nitrogen is present in a slowly soluble complex ammonia-$P_2O_5$ reaction product contained as a coating about particles of $P_2O_5$.

The product of this invention has reactivity differing quite considerably from pure $P_2O_5$. Our coated $P_2O_5$ reacts with water much less violently than regular $P_2O_5$. However, when milled, it reacts quite violently with water. X-ray patterns of the coated product show only lines for $P_2O_5$, and the relative intensity of the lines varies inversely as the ammonia content of the product. Also, chromatographic analysis of solutions of the product in cold ammonium acetate compare very closely with each other and with pure $P_2O_5$. These findings seem to indicate that the coating substance does not produce a chemical change or affect the degree of polymerization of the $P_2O_5$ contained in the nucleus, but rather, that the observed reactivity differences are due to the relatively unreactive barrier created by the coatings.

Coated $P_2O_5$ is much less reactive with atmospheric moisture than the prior art material. As a general comparison, when placed in an open dish exposed to the atmosphere, the common commercial uncoated $P_2O_5$ will begin to show a visible pick-up of moisture usually within seconds (as evidenced by the formation of "water" droplets about the particles) whereas our coated $P_2O_5$ can be similarly exposed for 30 minutes and in some cases even as long as several hours, without any noticeable affinity for atmospheric moisture. A similar retardation of reactivity is observed in aqueous and non-aqueous solutions. Significantly, once the coated material begins to hydrate or react, the reactivity rapidly begins to approach that of pure $P_2O_5$.

Because of the great difference in the initial reactivity between the prior art $P_2O_5$ and the products of the present invention, the usual methods for determining reactivity of $P_2O_5$ can not be employed to show a comparison between the two materials. For example, the prior art material could be tested for reactivity with 2-ethyl hexanol by measuring the rate of temperature rise in the exothermic reaction, whereas the products of this invention are virtually non-reactive with 2-ethyl hexanol. It has therefore been found more desirable to test the coated products in methanol or water-methanol solutions in order to get a measurable comparison of reactivity. Ordinary $P_2O_5$ reacts quite fast with methanol, but by no means as fast as with water or water-methanol solutions.

FIGURE 3 shows a comparison between ordinary and coated $P_2O_5$ in their exothermic reactions with methanol and water-methanol solutions, direct correlation between temperature rise characteristics and reactivity being well established for $P_2O_5$. Each curve, representing a different test sample, is labeled with the percent total nitrogen in the sample tested and the composition of the reacting solution. In these tests the temperature is determined at intervals until a maximum is reached (indicating substantially complete reaction).

The data are self-explanatory, establishing that pure, uncoated, $P_2O_5$ reacts completely within about 15 seconds; coated $P_2O_5$ that has been finely milled reacts within about 25 seconds; and coated unmilled $P_2O_5$ reacts much more slowly than either pure or a coated material that has been milled. In addition, it may be seen that the amount of coating used controls the reactivity i.e., higher percentages of total nitrogen give more unreactive materials. Thus, while $P_2O_5$ coated with only 0.21% total nitrogen takes more than four minutes to completely react, it is very much faster than $P_2O_5$ coated with 0.45% total nitrogen which does not show any reaction with methanol under the conditions of this test. A coated sample containing 0.7% total nitrogen, though completely unreactive in pure methanol, was found to react slowly in a solution of 3% water in methanol. The most significant feature of these data is the large change in temperature rise rate (reactivity) at very small percentages of total nitrogen. It should be noted that the acute dependence of temperature rise rate on total nitrogen is also found when testing coated $P_2O_5$, having much thicker coatings, with a more reactive substance (e.g., water).

The dependency of reactivity of coated $P_2O_5$ upon thickness of the ammonia-$P_2O_5$ layer is a particularly advantageous phenomenon in view of our finding that thickness can be accurately controlled by the present method. By the preferred method, making use of a dense fluidized bed, coating thickness is a function of the time the particles are retained in the bed and the bed temperature. At any given temperature, however, retention time will affect coating thickness only in the early stages of exposure to ammonia. If the temperature of the particles in the bed is thereafter raised the coating thickness will increase proportionally with the temperature.

FIGURE 4 illustrates the effect of the two variables upon coating thickness. The data for FIGURE 4 were obtained from a run accomplished batchwise by charging the fluidized-bed reactor with a bed of uncoated $P_2O_5$ and thereafter expanding this bed with dry air containing from 1 to 5% gaseous ammonia. For the first part of the run the bed was maintained at a temperature of 100°

C. This portion of the run is shown in FIGURE 4 by a hatched line. After 12 hours, and without disturbing any of the other operating conditions, the bed temperature was increased to 150° C. Initially, it can be seen, the total nitrogen content increased at a fairly rapid rate, leveling off after about six hours and thereafter not appreciably increasing at the original bed temperature with additional exposure to the ammonia-containing gases. Raising the bed temperature to 150° C. after 12 hours caused the total nitrogen to once again increase at a rapid rate but to a higher value than was achieved at 100° C.

By the present method any temperature below the sublimation point of $P_2O_5$ is suitable in the formation of the slowly soluble coatings of the invention. However, it is preferable to stay below 175° C. to avoid the tackiness and reduce the operating difficulties attending high temperature fluidization of $P_2O_5$. Temperatures as low as the boiling point of ammonia, −33° C., are feasible, while a preferred lower temperature is about 90° C. The ammonia content of the contacting gases may be varied somewhat without appreciably affecting the properties or quantity of coating, although generally gases richer in ammonia will cause a thicker coating to be formed at any given bed temperature and retention time. While there is no limitation on the concentration of ammonia which may be contained in the contacting gas, it is desirable when reacting by the preferred fluidized bed method in the preferred temperature range, to use a relatively small percentage of ammonia, say 0.1% to 10% $NH_3$ by volume. Nevertheless, high percentages of ammonia can be used, and for low temperature reactions, the gaseous stream may be desirably composed of pure ammonia.

EXAMPLE I

The method shown in our U.S. Patent 3,077,382, issued February 12, 1963, was first used to prepare the preferred feed for the present invention by condensation of gaseous phosphoric acid anhydride formed from the oxidation of elemental phosphorus in dry air.

The apparatus used comprised the components shown in FIGURE 1, except for the entrainment screen and gas cooler, and used superphosphoric acid (77% $P_2O_5$) as the scrubbing medium. The heat exchange apparatus consisted of two flat plate coils as shown. A pre-established bed of granular phosphoric acid anhydride, made in the same apparatus by a previous run, was expanded to a bed density of about 40 lbs./cu. ft. by actuating the blower and maintaining a flow rate of 0.6 ft./sec. for the uprising gases in the bed. Phosphoric acid anhydride vapor containing 11–170 p.p.m. water vapor was produced in the combustion chamber and transported by conduit to the interior of the fluidized bed near the bottom where it entered at a temperature of about 510°–570° C. City water was circulated through the cooling plates at a rate controlled to produce a bed temperature of 129°±1° C. Under these conditions condensation was continued for many hours. A constant flow of vaporous $P_2O_5$ feed was maintained, and condensed $P_2O_5$ solids were withdrawn from the bed at about an equivalent rate. The product was found to be a free-flowing, substantially opaque, agglomerated form of hexagonal $P_2O_5$ in the shape of small spheres or beads. The bulk density of this material was found to range between 67 and 74 lbs./cu. ft.

EXAMPLE II

Using the same apparatus and spherical $P_2O_5$ as produced in the above example, the unique coated composition of the present invention was manufactured.

Before fluidization the collector was charged with 600 lbs. of the $P_2O_5$. This starting bed was expanded by actuating blower and adjusting the gas rate to give a dense, fluidized phase. In this run the wet scrubber was eliminated, but in similar runs it was used to remove both fine particles and ammonia leaving the bed with the exhaust gases. After a steady state was obtained, with uniform continuous fluidization, dry, gaseous ammonia was injected into the recirculating fluidization gases upstream of the blower. A steady flow of ammonia gas was continued until the recirculating atmosphere contained about 5% by volume of ammonia gas, whereafter additional ammonia gas was added to maintain this concentration. Contact between the ammonia-containing gases and the fluidized $P_2O_5$ particles resulted in an exothermic reaction, and the heat of reaction was removed continuously to keep the bed at a temperature of 100°–170° C. Entrained particles were separated from the dilute overhead phase and returned to the bed through the dip leg. Samples of the reaction mass were periodically taken from the bed through the discharge conduit and analyzed for nitrogen content. No additional feed of $P_2O_5$ to the initial 600 lb. bed was allowed until the analyzed material showed about 3% total nitrogen. Thereafter, additional $P_2O_5$ was fed through the solids feed line to the fluidized bed. The gaseous ammonia feed was continued and coated particles containing 3–4% total nitrogen were removed from the bed at about the same stoichiometric rate as feed entered the bed. The product of this run was similar to that shown in FIGURE 2, i.e., comprising encapsulated, substantially opaque spherical agglomerated particles.

Other runs using substantially the same apparatus and method as Example II, have been accomplished to produce a wide range of coating thicknesses. In the preferred range we have produced, for example, compositions having 0.2%, 0.4%, 0.7%, 1.0%, 2.0%, 3.0%, 4.1%, 5.6%, 6.0%, and 8.4% total nitrogen.

The compositions of the invention, in addition to their improved characteristics when used in place of conventional $P_2O_5$, are useful in new applications and where the orthorhombic form of $P_2O_5$ was formerly required. Coated $P_2O_5$ can be used as a substitute for the slow-acting orthorhombic form in clay bleaching and soil stabilization. In the technology of the latter field there has long been a need for a low-cost, easily-handled substitute for phosphoric acid, but by virtue of its rapid reactivity, ordinary prior art $P_2O_5$ has been found to be unattractive. An appraisal of the problems of soil stabilization, and the use of a slow acting $P_2O_5$ as possibly contributing to their solution is explained in Industrial and Engineering Chemistry, volume 52, No. 10, October 1960, pp. 857–8.

The particulate materials which can be coated by the present invention are the various amorphous and crystalline forms of phosphoric acid anhydride. These include the common commercial crystalline $P_2O_5$ belonging to the rhombohedral class of the hexagonal system (known in the art as hexagonal or H-form $P_2O_5$), and the two polymeric forms which belong to the orthorhombic system, being usually designated as the O and O' forms.

Considerable variation in the technique and apparatus for applying the coating is possible. Uniform coatings are formed by the method of this invention using a fluidized, agitated, spouting, stirred, falling or moving bed of any type which produces good contact between the $P_2O_5$ solids and the gaseous ammonia without destroying the coatings formed. Suitable apparatus for applying the coatings, other than that described in the preferred embodiment, include pneumatic conveyors, agitating rotary conveyors, spray chambers and towers of various types. Fluidization apparatus employing slugging, fountain, bubbling, dilute, quiescent, or any homogeneous or non-homogeneous bed, either similar or unlike the dense fluidized bed which is preferred, may also be used.

The foregoing detailed description has been given for clearness of understanding only, and no unnecessary limitations should be understood therefrom, as modifications will be obvious to those skilled in the art.

We claim:

1. As a composition of matter, particles of phosphoric acid anhydride in the form of substantially opaque, agglomerated spheroids having individual, substantially uniform, continuous coatings of a slowly water soluble complex ammonia-phosphoric acid anhydride reaction product, said coating comprising less than about 22.4% and as little as about 0.01% total nitrogen, measured as $NH_3$, based on the total weight of the particles.

2. The composition of claim 1 wherein said coatings have a nitrogen content, measured as $NH_3$, of not less than 0.1% nor more than 10.0% of the total weight of the particles.

3. A method of manufacturing coated phosphoric acid anhydride which comprises reacting gaseous ammonia with phosphoric acid anhydride particles maintained in a dense fluidized bed and at a temperature above $-33°$ C. but below the sublimation temperature of phosphoric acid anhydride, for a time sufficient to effect the formation of a slowly water soluble complex ammonia-phosphoric acid anhydride reaction product coating about the particles of phosphoric acid anhydride, said coating comprising less than about 22.4% and as little as about 0.01% total nitrogen, measured as $NH_3$, based on the total weight of coated phosphoric acid anhydride.

4. A method of manufacturing coated phosphoric acid anhydride which comprises reacting phosphoric acid anhydride particles, substantially isolated from the influences of moisture and maintained in a dense fluidized bed at a temperature above $-33°$ C. but below the sublimation temperature of phosphoric acid anhydride, with ammonia contained in an anhydrous gaseous mixture for a time sufficient to effect the formation of a slowly water soluble complex ammonia-phosphoric acid anhydride reaction product coating about the particles of phosphoric acid anhydride, said coating comprising less than about 22.4% and as little as about 0.01% total nitrogen, measured as $NH_3$, based on the total weight of coated phosphoric acid anhydride.

5. The method as set forth in claim 4 wherein the bed is maintained at a temperature within the range of $90°$–$175°$ C.

References Cited in the file of this patent

UNITED STATES PATENTS

| | | |
|---|---|---|
| 2,122,122 | Woodstock | June 28, 1938 |
| 2,600,253 | Lutz | June 10, 1952 |
| 2,717,198 | Jones et al. | Sept. 6, 1955 |
| 2,907,635 | Tucker | Oct. 6, 1959 |
| 2,974,010 | Koster | Mar. 7, 1961 |
| 2,988,426 | Cross et al. | June 13, 1961 |

OTHER REFERENCES

Journal of the American Chemical Society, vol. 51, pages 2121–2126.

Harris et al.: "Chemical Reactions of Dried Substances (I) Ammonia and Phosphorus Pentoxide."